W. A. SCHLEICHER.
SNAP HOOK.
APPLICATION FILED APR. 24, 1908.

963,475.

Patented July 5, 1910.

WITNESSES
W. W. Swartz
G. B. Bleming

INVENTOR
Wm A. Schleicher,
by Bakewell, Byrnes & Parmelee,
his attys.

UNITED STATES PATENT OFFICE.

WILLIAM A. SCHLEICHER, OF CLEVELAND, OHIO.

SNAP-HOOK.

963,475.  Specification of Letters Patent.  Patented July 5, 1910.

Application filed April 24, 1908. Serial No. 428,946.

*To all whom it may concern:*

Be it known that I, WILLIAM A. SCHLEICHER, of Cleveland, Cuyahoga county, Ohio, have invented a new and useful Snap-Hook, of which the following is a full, clear, and exact description, reference being had to the accompanying drawings, forming part of this specification, in which—

Figure 1:
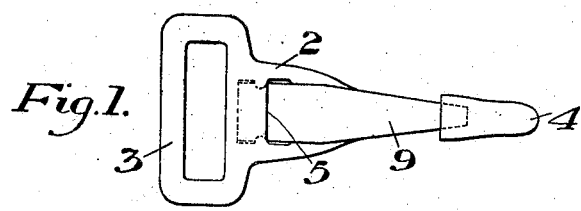
Figure 2:
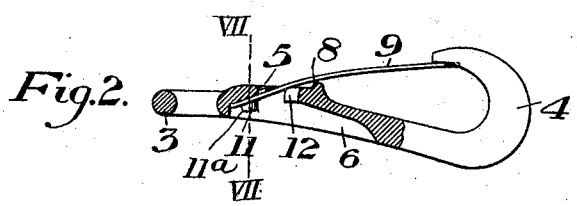
Figure 3:
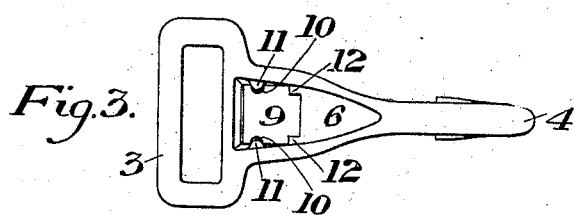
Figure 4:
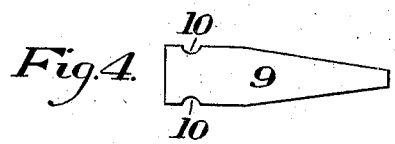
Figure 5:
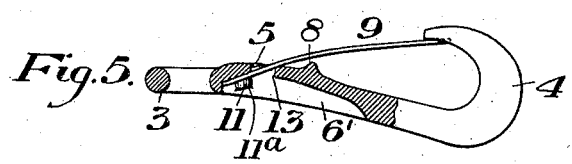
Figure 6:
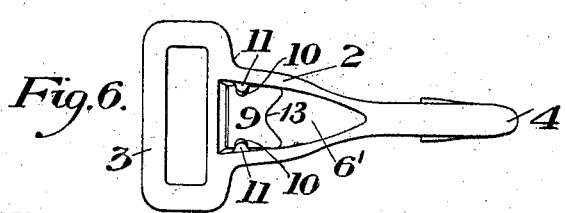
Figure 7:

Figure 1 is a top plan view of one form of hook embodying my invention; Fig. 2 is a side view of the same partly in section; Fig. 3 is a bottom plan view; Fig. 4 is a plan view of the spring tongue removed; Fig. 5 is a view similar to Fig. 2, but showing a modification; and Fig. 6 is a bottom plan view of the hook shown in Fig. 5. Fig. 7 is a section on the line VII—VII of Fig. 2.

My invention has relation to that class of snap hooks in which the tongue is formed of a piece of spring metal, and is designed to provide novel means of simple and efficient character for securing the spring in place and for providing it with suitable bearings.

The precise nature of my invention will be best understood by reference to the accompanying drawings, in which I have shown two forms thereof, and which will now be described, it being premised, however, that various changes may be made in the details of construction and arrangement without departing from my invention as defined in the appended claims.

In the drawings, the numeral 2 designates the shank of the hook, which is provided with the usual eye or loop 3 at one end, and whose other end is bent upwardly to form the hook proper or nose 4. Near the forward bar of the loop or eye 3 the shank is provided with an opening 5 therethrough which communicates with the cut-away or hollowed-out portion 6 on the under side of the shank. Forward of this opening, on the upper surface of the shank is a transverse rib or bridge 8, which forms a bearing for the spring tongue 9, when the latter is depressed. This tongue, which is formed from a thin piece of spring metal, is inserted through the opening 5, and is secured in place by the engagement of notches 10 in its lateral edges with ribs or lugs 11 which are formed at opposite sides of the cut away portion 6 at the underside of the shank. The notches 10 may, however, be formed at other places and the ribs 11 be correspondingly located. After the tongue has been engaged with these ribs or lugs, the latter are preferably upset, as shown at 11ª in Figs. 2, 5 and 7, thereby securing the tongue firmly in place.

In the form of the invention shown in Figs. 1, 2 and 3, the forward wall of the opening 5 is provided with the rearwardly extending lugs or projections 12, which bear against the under side of the spring tongue. In the forms shown in Figs. 5 and 6, this bearing is provided by a rearward extension 13 of the central portion of the forward wall of said opening. The front wall of the opening 5 may, however, be otherwise shaped to provide this bearing.

The construction described provides a hook which can be cheaply and rapidly manufactured. The spring tongues can be stamped from sheet steel and readily applied and secured to the body portion of the hook.

What I claim is:—

1. A snap hook having a shank with an opening therethrough, and a cut-away portion, said shank having ribs projecting into said cut-away portion, and a spring tongue having notches receiving the ribs, substantially as described.

2. A snap hook having a shank with an opening therethrough, a cut-away portion in the underside of the shank, ribs projecting into the cut-away portion from the side walls thereof, and a spring tongue having notches receiving the ribs, substantially as described.

3. In a snap hook, a shank, a bill, said shank having a recess at its rear side, cheek pieces at each side of said recess, said shank having a spring passage between said cheek pieces, a spring standing in said passage and having an under-bearing support at the forward edge thereof, the forward end of said spring resting under said bill, notches in the opposite side edges of said spring near the rear end thereof, an integral lug at the inner side of each cheek piece standing in said notches and engaging and holding the spring at such points in said recess.

In testimony whereof, I have hereunto set my hand.

WILLIAM A. SCHLEICHER.

Witnesses:
 GRANT R. SMYTHE
 JOHN MCGRATH.